(No Model.)
A. ROCHAT.
SAUCEPAN.
No. 601,589. Patented Mar. 29, 1898.
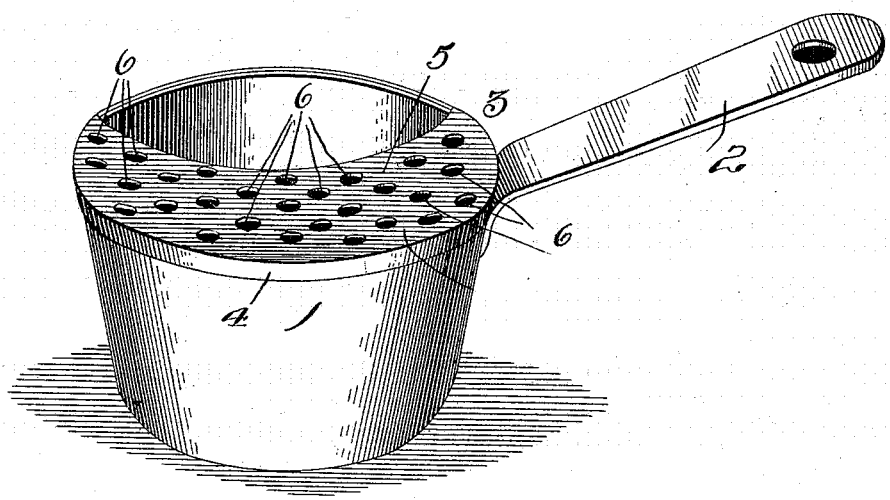
Fig. 1.
Fig. 2.
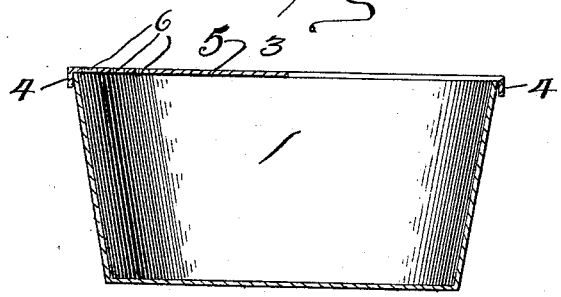
WITNESSES
C. D. Kesler
J. E. Tappan
INVENTOR,
Arthur Rochat,
by John Wedderburn
Attorney

UNITED STATES PATENT OFFICE.

ARTHUR ROCHAT, OF GOLDENGATE, CALIFORNIA.

SAUCEPAN.

SPECIFICATION forming part of Letters Patent No. 601,589, dated March 29, 1898.

Application filed October 10, 1896. Serial No. 608,494. (No model.)

*To all whom it may concern:*

Be it known that I, ARTHUR ROCHAT, a citizen of Switzerland, residing at Goldengate, in the county of Alameda and State of California, have invented certain new and useful Improvements in Saucepans; and I do hereby declare the following to be a full, clear, and exact description of the invention, such as will enable others skilled in the art to which it appertains to make and use the same.

A great deal of difficulty has been met with in pouring off the water from a saucepan or other vessel employed in boiling vegetables and the like by reason of the fact that one is apt to spill the water on his hand and wrist and is also in danger of pouring off the vegetables with the water. The usual method of doing this is to hold the saucepan in one hand and the lid in the other, slightly separated from one edge of the pan. My invention is designed to obviate these difficulties; and it consists of a saucepan-cover made up of an outer frame adapted to embrace the upper end of a saucepan and a substantially semicircular web connecting the upper edge of said rim, having a series of perforations therein.

The invention is clearly illustrated in the accompanying drawings, in which—

Figure 1 represents a perspective view of a saucepan with my improved cover applied thereto. Fig. 2 is a section through the same.

Like reference-numerals indicate like parts in the different views.

The saucepan 1 has the usual handle 2 and is in all respects of the ordinary form and construction. Adapted to fit upon the upper edge of the saucepan 1 is my improved cover 3, the same being made of a circular rim 4, whose upper edges are connected by a substantially semicircular web 5, provided with a series of perforations 6 6 therein.

When it is desired to pour off the liquid contents of a saucepan, the same may be readily done by grasping the pan by its handle 2 and tilting the same slightly, allowing the water to flow off through the perforations 6 in the web 5. It will thus be seen that there is no danger of spilling the boiling water upon the hand or accidentally discharging the vegetables from the pan.

The device is extremely simple in construction, effective in operation, and can be produced at a cost but little greater than that of the ordinary saucepan.

Having now described my invention, what I claim as new, and desire to secure by Letters Patent, is—

1. As a new article of manufacture, a cover for a cooking or other vessel, made up of a rim adapted to embrace the upper edge of the vessel and a web of open-work material connected to said rim, the said web being of such size and shape as to leave an enlarged opening between the inner edge thereof and one portion of said rim.

2. As an article of manufacture, a cover for a cooking or other vessel, consisting of an outer circular rim adapted to embrace the upper edge of the vessel and a substantially semicircular web of material connected to the upper edge of said rim, provided with a series of perforations therein and forming between the inner edge thereof and said rim an enlarged opening, as and for the purpose set forth.

In testimony whereof I have signed this specification in the presence of two subscribing witnesses.

ARTHUR ROCHAT.

Witnesses:
RICHARD ST. JOHN,
DU RAY SMITH.